(12) United States Patent
Lin (10) Patent No.: US 6,336,649 B1
(45) Date of Patent: Jan. 8, 2002

(54) STRUCTURE OF FOLDABLE BICYCLE

(76) Inventor: Chin-Chuan Lin, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/517,326

(22) Filed: Mar. 2, 2000

(51) Int. Cl.[7] .............................................. B62K 15/00
(52) U.S. Cl. ...................... 280/278; 224/418; 280/202; 280/287; 280/288.4
(58) Field of Search .................. 280/287, 278, 280/288.4, 293, 295, 202, 304.5; 224/416, 418, 422, 426; 70/233–236, 227

(56) References Cited

U.S. PATENT DOCUMENTS

| 2,359,764 A | * | 10/1944 | Johnson | 280/287 |
| 4,067,589 A | * | 1/1978 | Hon | 280/278 |
| 4,462,606 A | * | 7/1984 | Hon | 280/278 |
| 5,794,958 A | * | 8/1998 | Hsiao | 280/287 |
| 5,836,602 A | * | 11/1998 | Wang | 280/287 |

FOREIGN PATENT DOCUMENTS

| JP | 406032272 | * | 2/1994 | 280/287 |

* cited by examiner

*Primary Examiner*—Anne Marie Boehler
(74) *Attorney, Agent, or Firm*—Douherty & Troxell (57) ABSTRACT

An improved structure foldable bicycle that provides for the folding of the major sections of a bicycle, easy portability and storage, safety and stability, time and energy savings, and additional practicality which is comprised of upper and lower plates as well as a cam lever between the top tube and head tube of the front frame that enables folding and securing, with a quick-release stem clamp between the top tube and the handlebar providing for handlebar extension and retraction. An insert box and an insert block as well as a coupler box and an coupler block are respectively disposed between the upper and lower extents between the front frame and the rear frame that provide for folding and securing. A quick-release clamp installed between the seatpost and the seatpost tube at the lower extent of the saddle provides for extension, retraction, and tightening into position. A side stand installed at the lower extent of the rear frame provides for the vertical posturing of the folded frame. Pedals at the bottom bracket are equipped with a sleeve and a cam-lever for removability. A movable rear rack is equipped with a roller wheel that enables pushing and pulling of the folded bicycle frame. A tab having a through-hole is situated on the seatstay for the insertion of a lock pin with an attached chain. As such, the present invention provides improved functionality and increases the practical value of such products.

1 Claim, 13 Drawing Sheets

FIG.13

STRUCTURE OF FOLDABLE BICYCLE

BACKGROUND OF THE INVENTION

1. Field of the Invention

The invention herein relates to an improved structure foldable bicycle that provides an extendible and retractable handlebar; an insert box and an insert block as well as a coupler box and a coupler block between the front frame and the rear frame that provides for folding; an easily adjustable extendible and retractable saddle; pedals that can be turned inward, disassembled, and assembled; a side stand for upright support; and a movable rear rack equipped with a roller wheel for moving the folded bicycle frame about with minimal effort.

2. Description of the Prior Art

Most conventional bicycles have fixed physical dimensions and since they cannot be folded, the bulk creates considerable portability and storage difficulties. Bicycles used for commuting often times cannot be brought indoors and must be left outside exposed to wind and rain as well as the possibility of theft. Neither can drivers place such bicycles in the trunks of their vehicles for touring and exercise in the suburbs. Although some foldable bicycles are sold on the market, their structural design far from optimal. For example, the saddles cannot be sturdily secured and easily slide down when force is applied, which results in user inconvenience and an incapablity of achieving performance. Furthermore, the front and rear frame sections of such foldable bicycles are assembled by means of screw fasteners, consuming much time and effort as well as requiring a set or tools, which also leads to inconvenient operation and utilization. The incapability of being completely collapsed results in jutting sections that also inconveniently obstructs trunk placement. The folded frames cannot stand vertically and even more seriously, such folded bicycles are not only of excessive weight, but since tremendous strength is needed to push or pull them on the ground, they must be manually carried, a task that cannot be accomplished by the average person, child, or woman. This limits the scope of utilization. Additionally, the handlebar section cannot be quickly folded or fixed into position after extension or retraction, consuming much time and energy. Furthermore, after the front and rear wheel are brought together, unfolding readily occurs because there is no means of maintaining the folded state. Then too, the area of folding is easily becomes loose and untightenable, compromising safety considerations. Since manufacturers and consumers have faced these shortcomings for quite some time, providing increased performance and, furthermore, enhanced practical value of such products requires an improved structure foldable bicycle, which is the principal motivation underlying the invention herein.

SUMMARY OF THE INVENTION

The primary objective of the invention herein is to provide an improved structure foldable bicycle in which the major sections of the bicycle frame are collapsible to provide for easy portability and storage, safety and stability, time and energy savings, and additional practicality.

To enable a further understanding of the technological content, innovative features, and functionality of the present invention, the brief description of the drawings below is followed by the detailed description of the preferred embodiments.

DETAILED DESCRIPTION OF THE PREFERRED EMBODIMENTS

Referring to FIG. 1, FIG. 2A, FIG. 2B, and FIG. 3, the saddle 21 of the invention herein is installed into a foldable rear frame 2 and to provide for the rapid height adjustment of the saddle 21, a seatpost 210 is disposed at the lower extent of the saddle 21; the seatpost 210 is inserted into a seatpost tube 22 and to tighten it into position, a quick-release clamp 220 is situated around the top end of the seatpost tube 22; the said quick-release clamp 220 consists of a band 221 having through-holes 2211 in the two ends, a long threaded shaft 223 terminated by a cam-lever 224, and a pressure plate 225 under the cam-lever 224, wherein the threaded shaft 223 is inserted into the through-holes 2211 of the band 221, a washer 222 and a nut 226 are then placed on the rear extent, and the nut 226 is tightened such that the untensioned band 221 is squeezed between the nut 226 and the pressure plate 225 in a mechanical arrangement that enables the height adjustment and securing of the seatpost 210.

Figure 1:
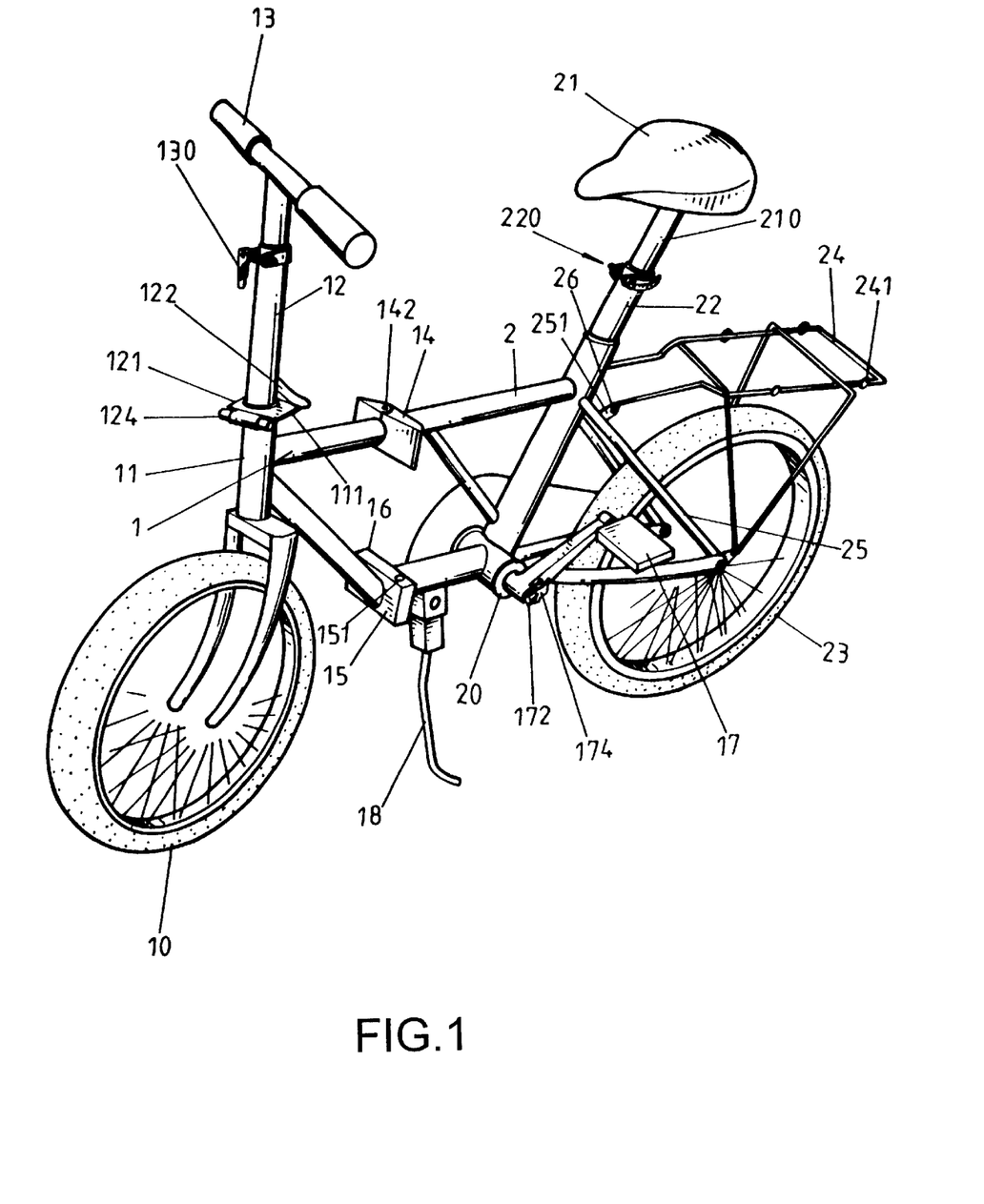
FIG. 1 is an isometric drawing of the invention herein.
Figure 2A:
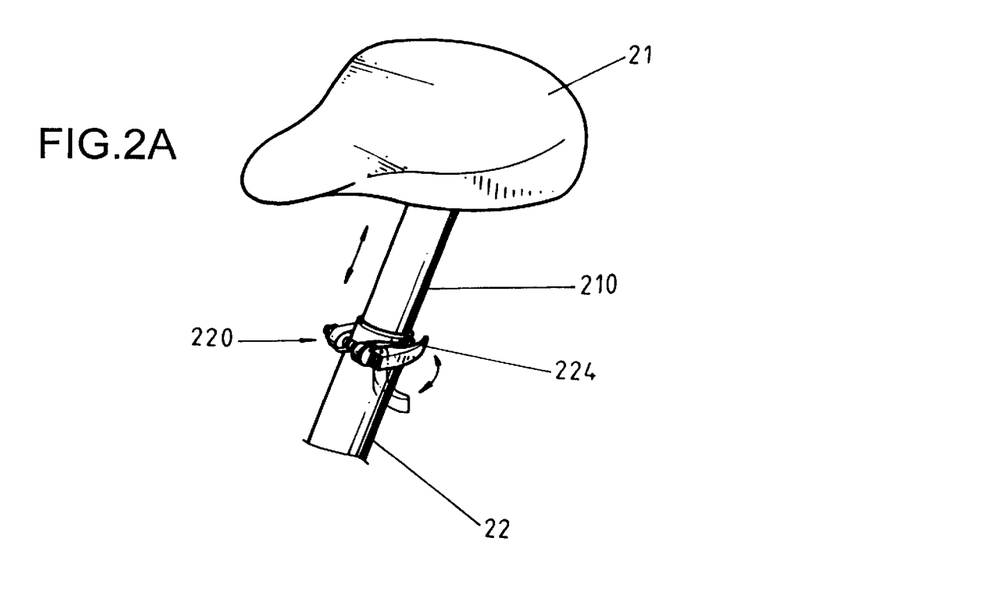
FIGS. 2A and 2B is isometric and exploded drawing of the saddle seat post clamp of the invention herein.
Figure 2B:
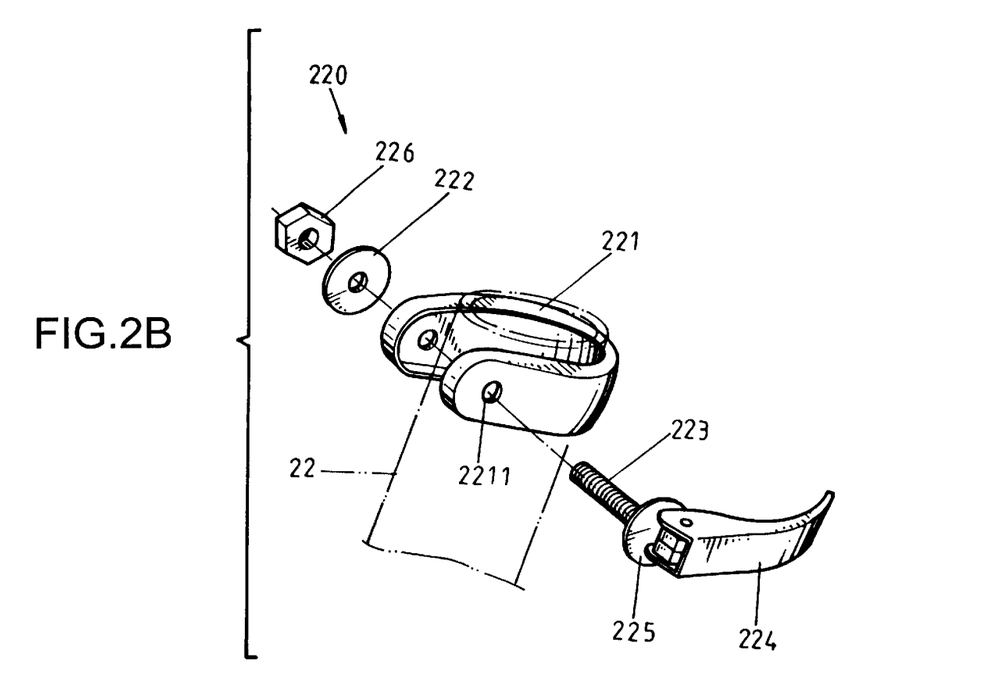
Figure 3:
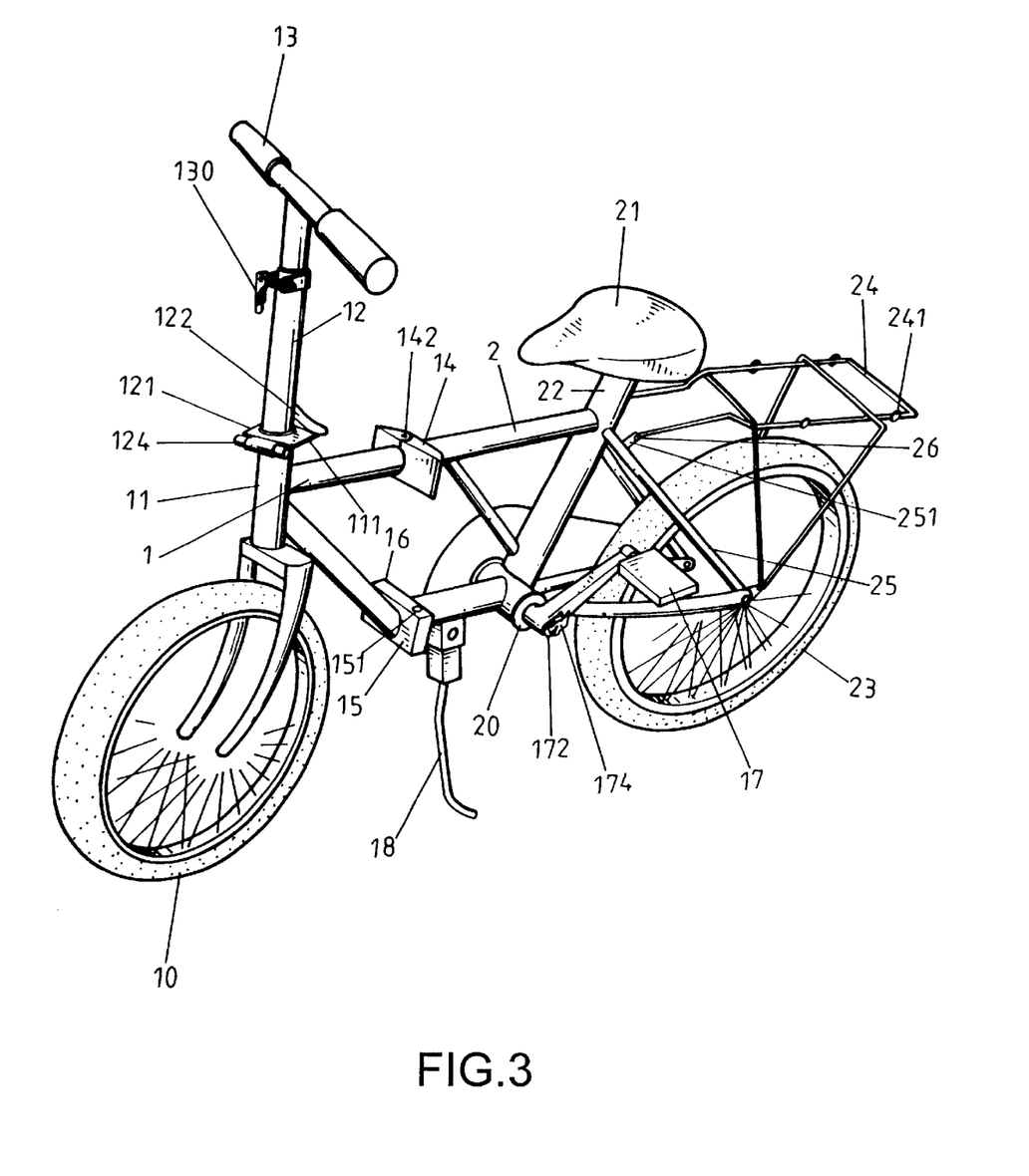
FIG. 3 is an isometric drawing of the invention when the saddle is lowered.
Figure 4:
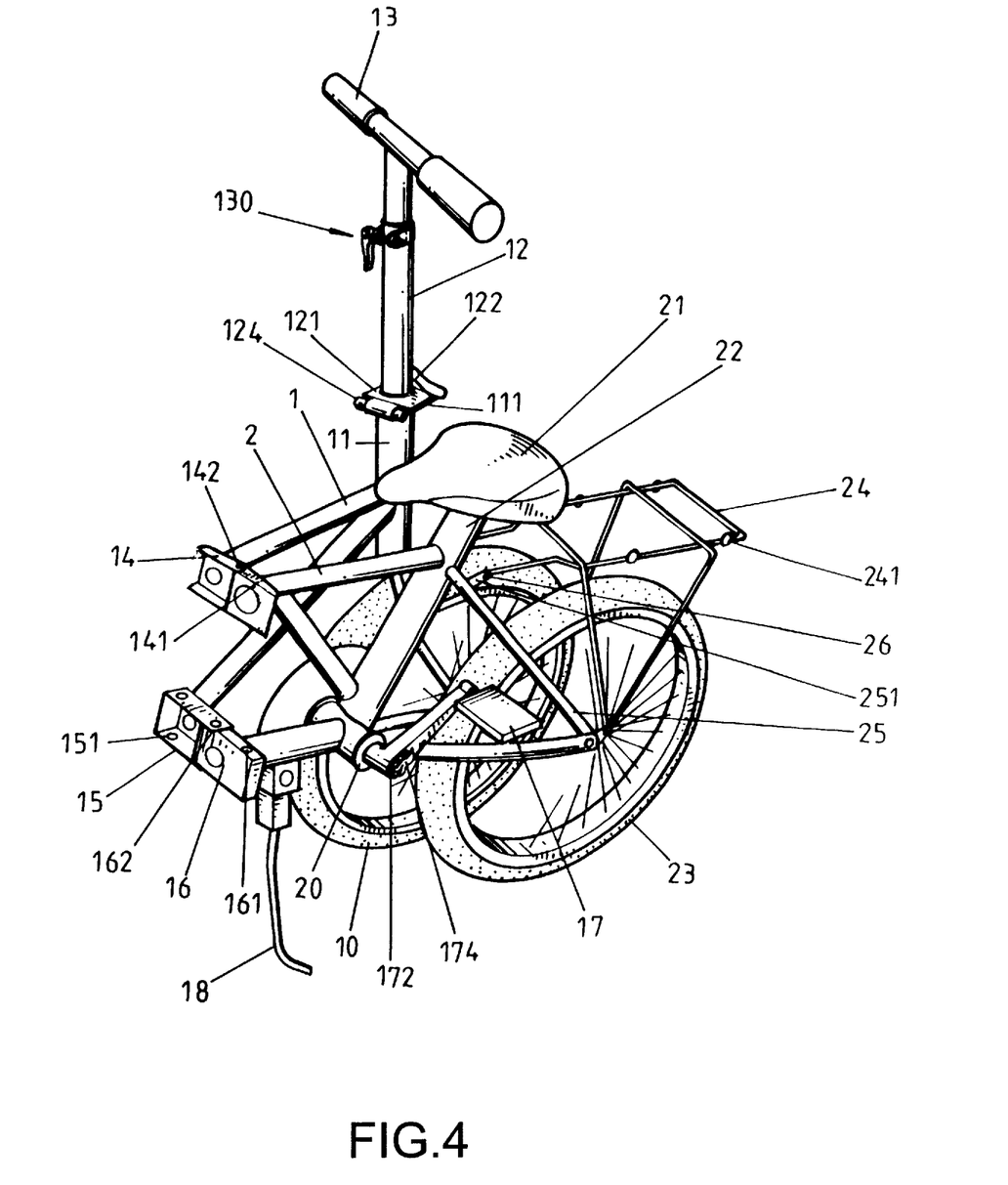
FIG. 4 is an isometric drawing of the folded front and rear frame of the invention herein.
Figure 5:
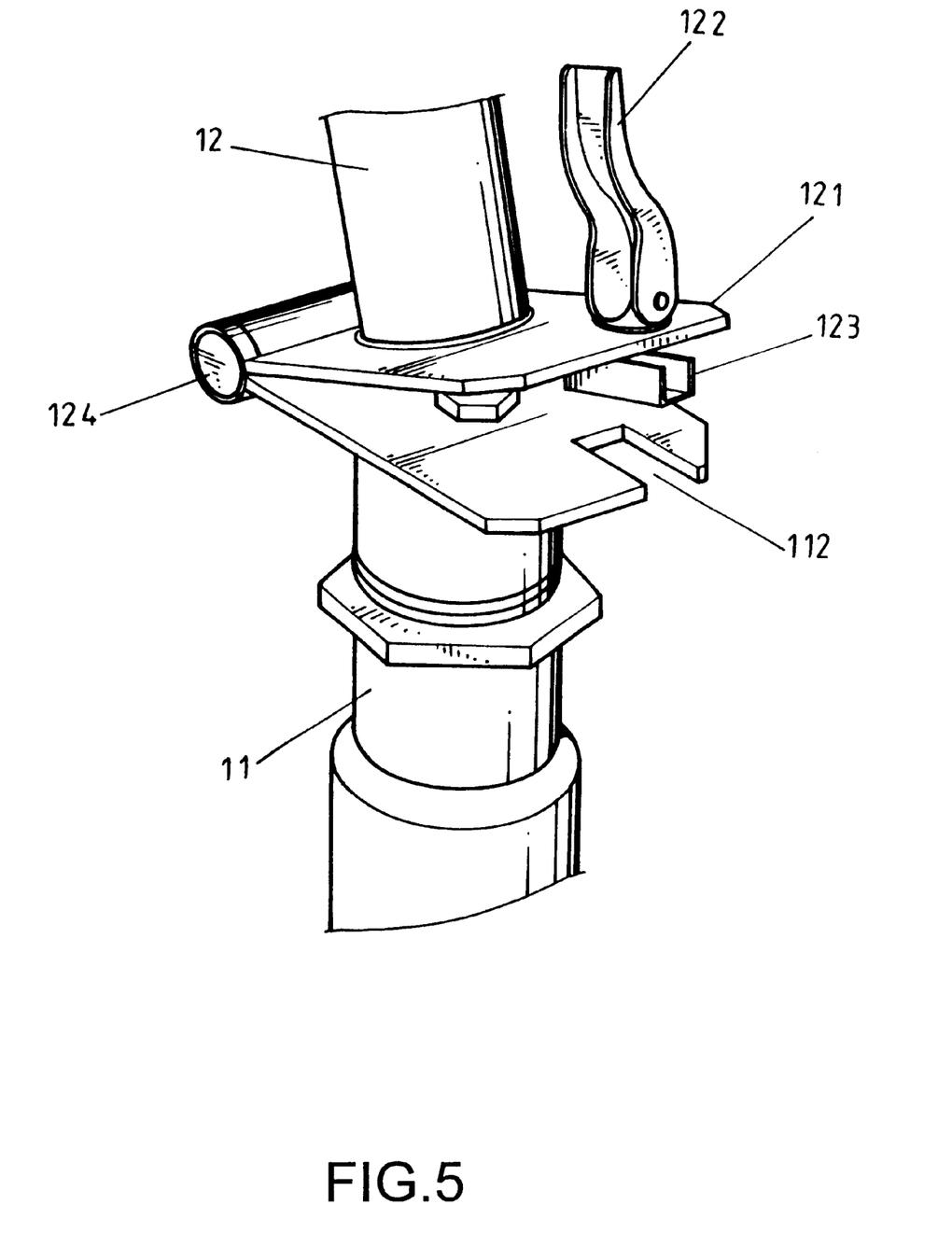
FIG. 5 is an isometric drawing of the folded handlebar or the invention herein.
Figure 6:
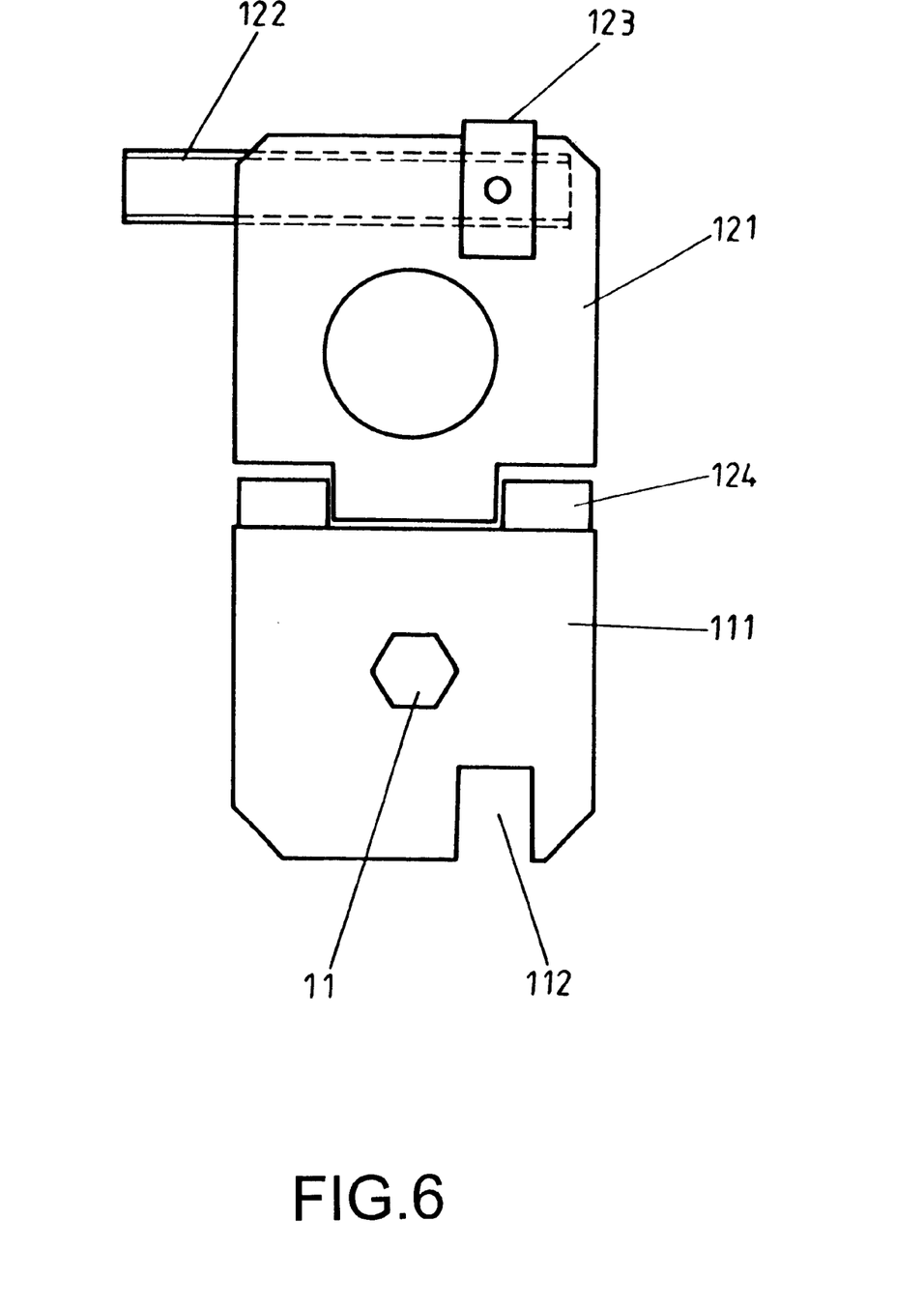
FIG. 6 is an isometric drawing of the upper and lower plates of the invention herein.
Figure 7:
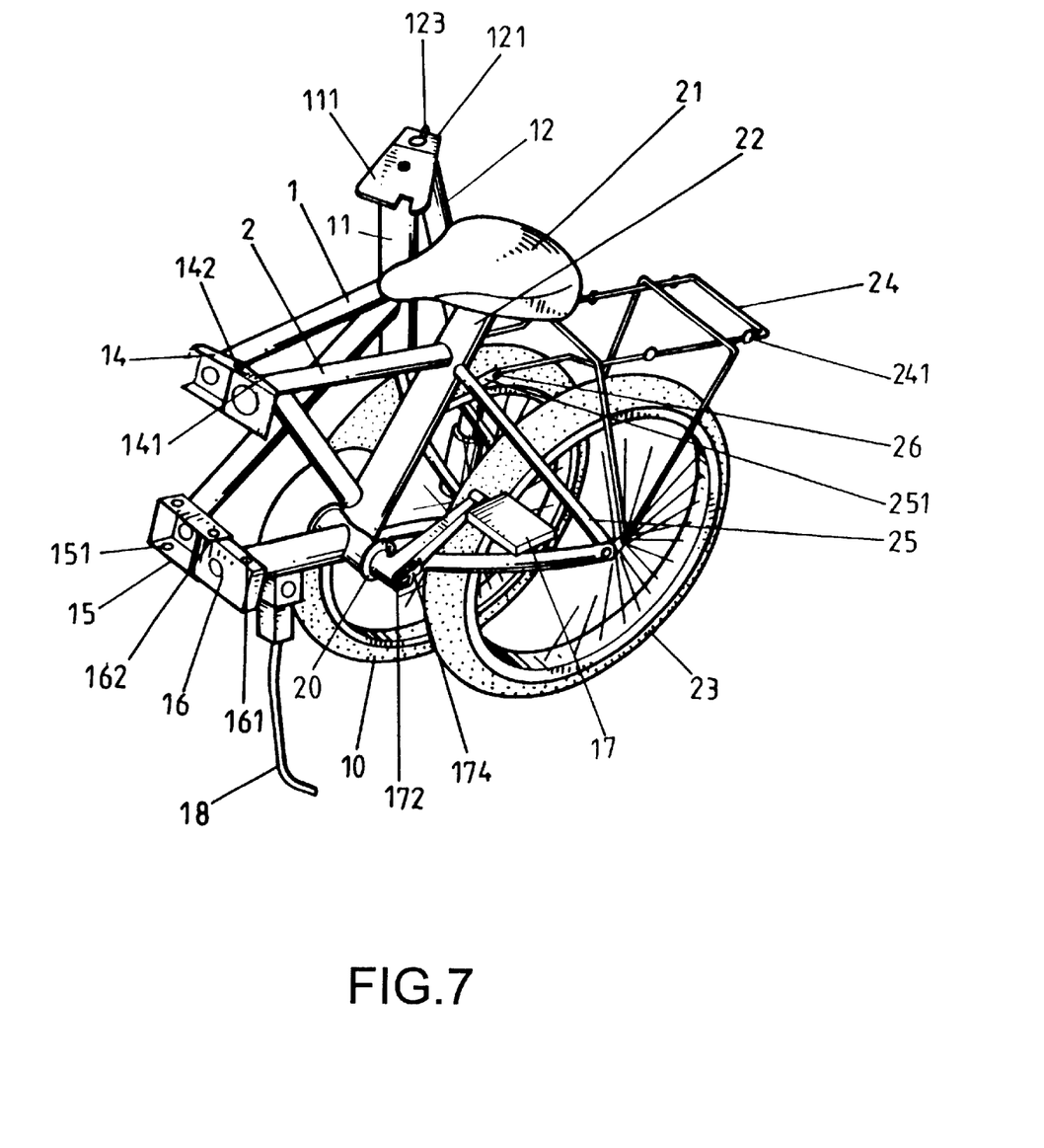
FIG. 7 is an isometric drawing of invention herein when the handlebar is folded down.
Figure 11:
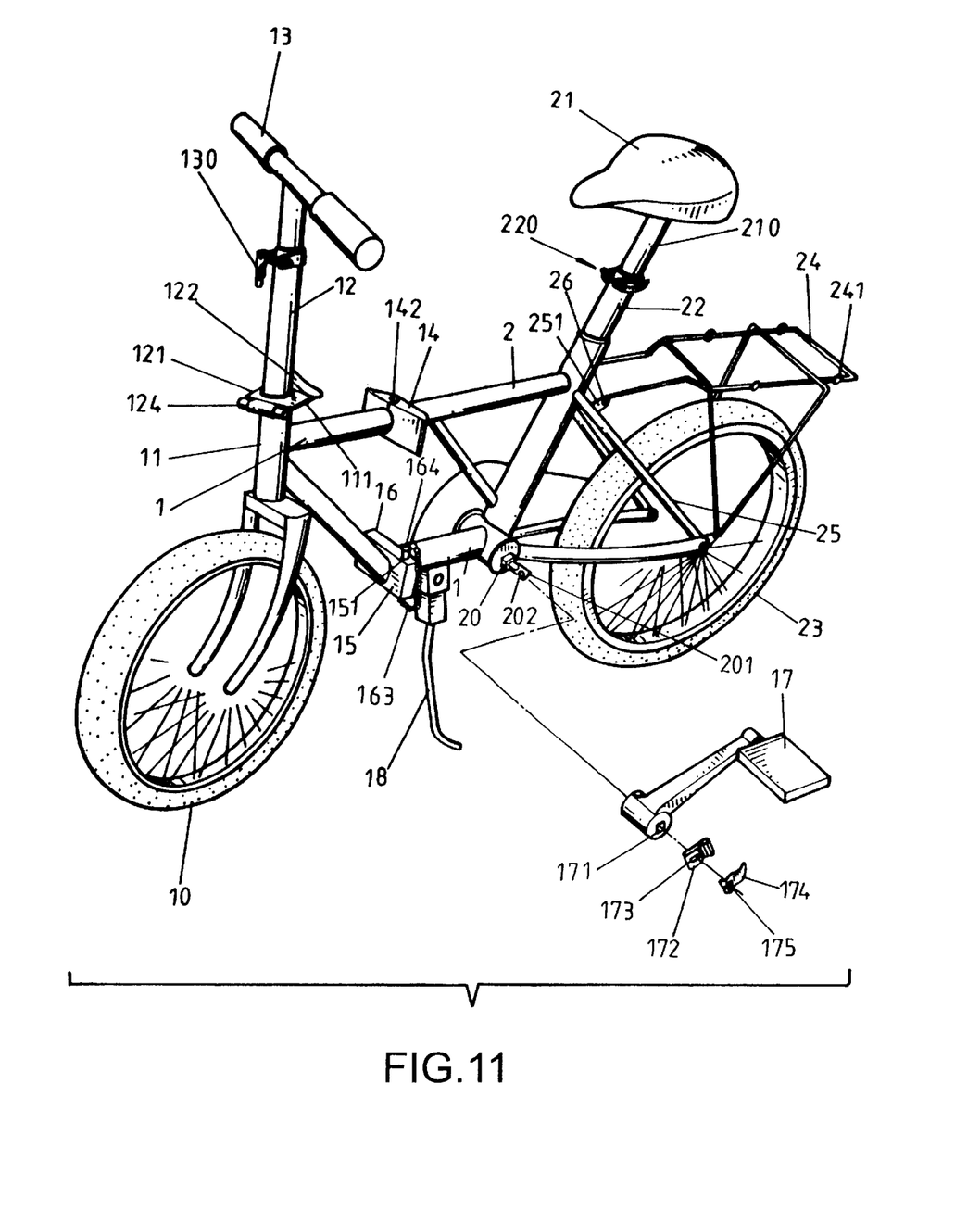
FIG. 11 is an exploded drawing of the coupler box, coupler, insertion pin, and pedal of the invention herein.
Figure 12A:
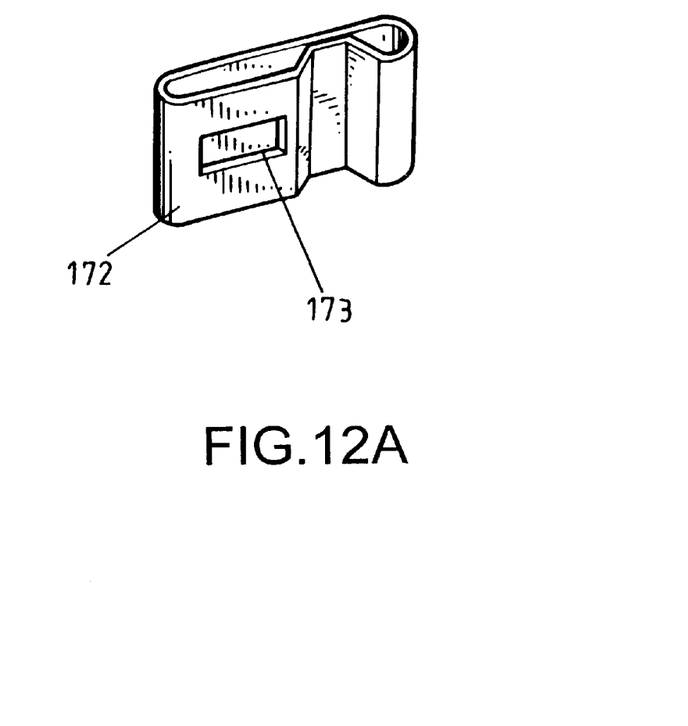
FIGS. 12A and 12B is an isometric drawing of the sleeve and cam-lever of the invention herein.
Figure 12B:
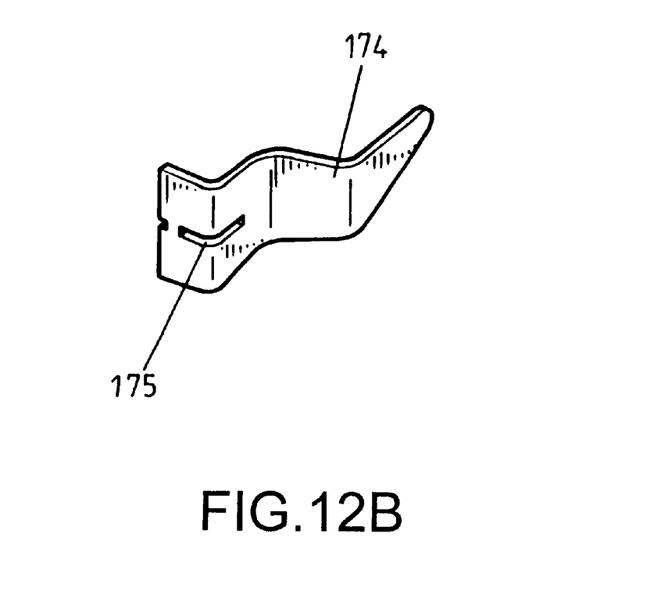
Figure 13:
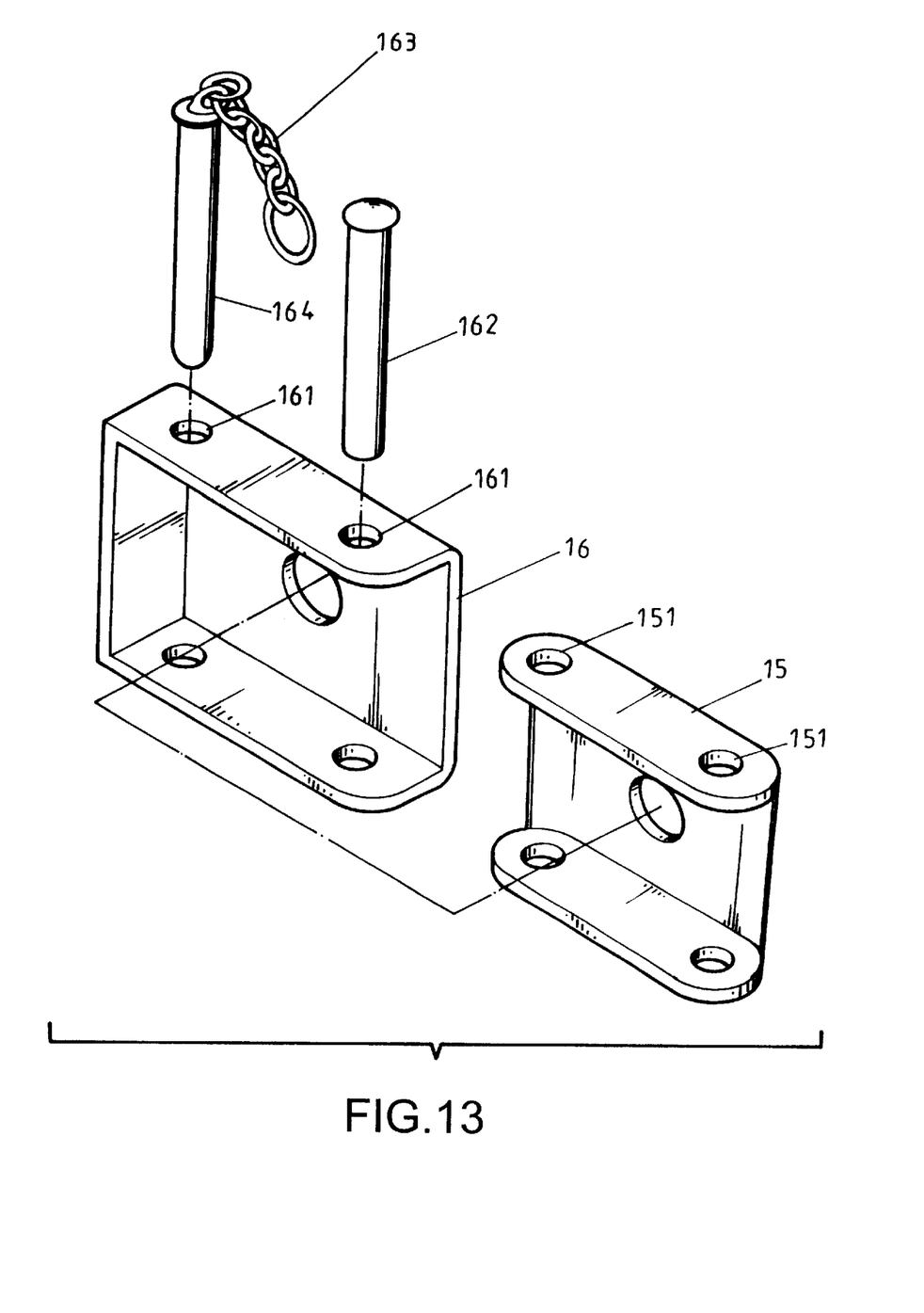
FIG. 13 is an exploded drawing of the coupler box and the coupler block of the invention herein.

Referring to FIG. 1 and FIG. 4, an insert box 14 and an insert block 141 as well as a coupler box 15 and a coupler block 16 are respectively disposed between the front frame 1 and the rear frame 2 to provide for the folding and unfolded assembly of the invention herein; to enable efficient swiveling, a hinge pin 142 is installed in between the insert box 14 and the insert block 141 and a hinge pin 162 is similarly installed in between the coupler box 15 and the coupler block 16;

furthermore, an insertion pin 164 with an attached chain 163 is placed through the holes 161 and 151 in the outer ends of the coupler block 16 and coupler box 15 (as indicated in FIG. 11), such that when the front and rear frame 1 and 2 are folded together, the front wheel 10 of the front frame 1 and the handlebar 13 are turned against the side of the rear wheel 23.

Referring to FIG. 1, FIG. 5, FIG. 6, and FIG. 7, to enable the folding over of the handlebar 13, the upper plate 121 and lower plate 111 of a hinge 124 are disposed between the head tube 11 above the front wheel 10 of the front frame I and the quick-release stem clamp 130 equipped top tube 12 that provides for the extension and retraction of the handlebar 13; a cam-lever 122 is installed on the upper plate 121 enables a fixed closure with the lower plate 111, while a movable insert block 123 is situated at the lower extent of the cam-lever 122 and aligned with a notch 112 formed in the lower plate 111 such that when the U-shaped insert block 123 is fitted into the notch 112 of the lower plate 111 and rotated, followed by pressing the cam-lever 122 down, the upper and lower plates 121 and 111 are clamped together, with the reverse of the said operation loosening and once again allowing the folding over of the handlebar 13.

Figure 10:
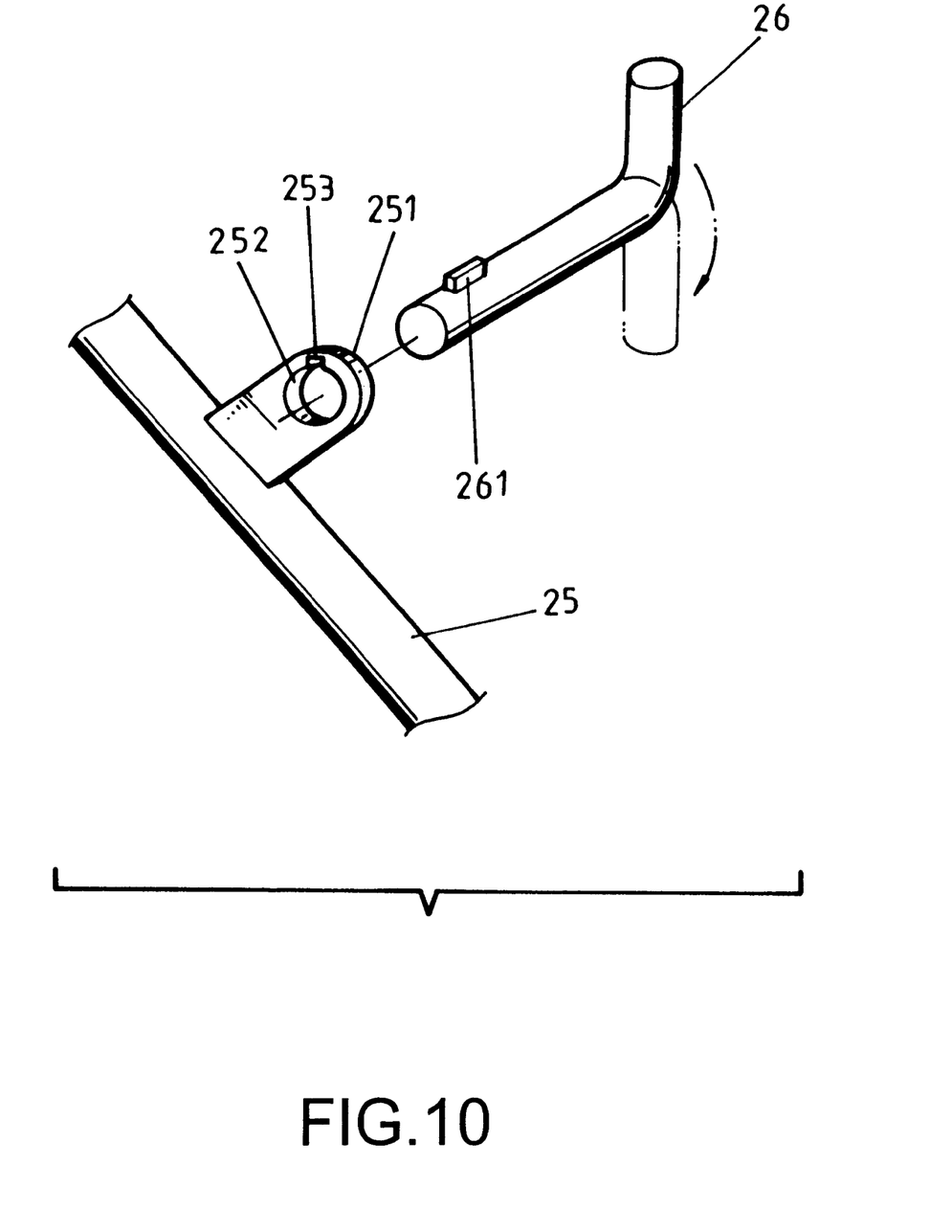
FIG. 10 is an exploded drawing of the seatstay and lock pin of the invention herein.

Referring to FIG. 1 and FIG. 10, in the invention herein, a through-hole 252 having a slot 253 is situated at top of the rear frame 2 seatstay 25 to secure the folded front wheel 10, a rear wheel 23, and handlebar 13, wherein an L-shaped lock pin 26 having an attached chain and a protruding block 261 formed at the end is inserted into the through-hole 252 in a tab 251 to maintain the folded position of the front wheel 10, rear wheel 23, and handlebar 13, wherein after the protruding block 261 formed on the end of the lock pin 62 is slid past the slot 253 of the through-hole 252, the lock pin 26 is rotated away from the slot 253 to fix its insertion.

Figure 8:
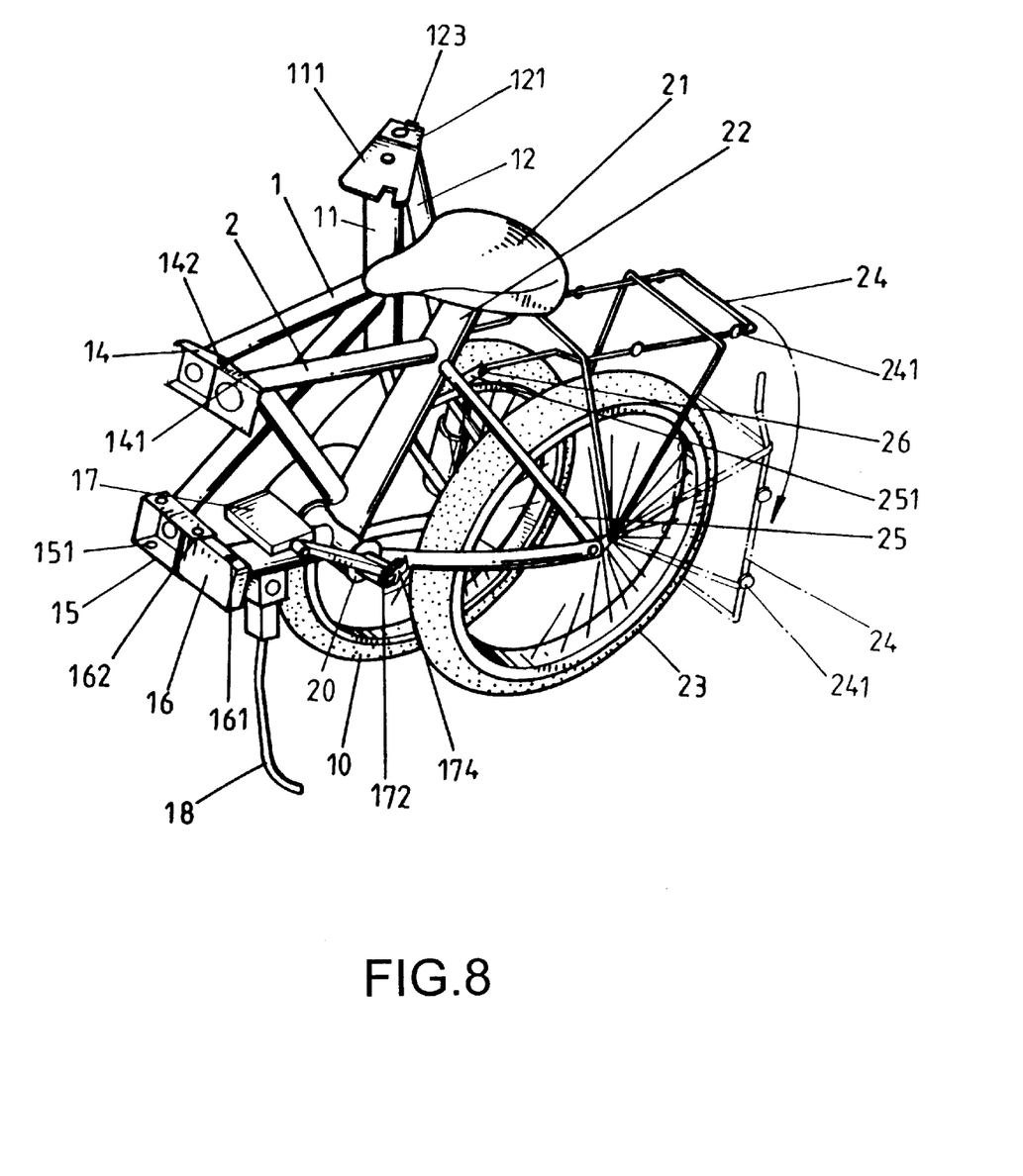
FIG. 8 is an isometric drawing of the invention herein when the pedals face inward and the rear frame is folded back.
Figure 9:
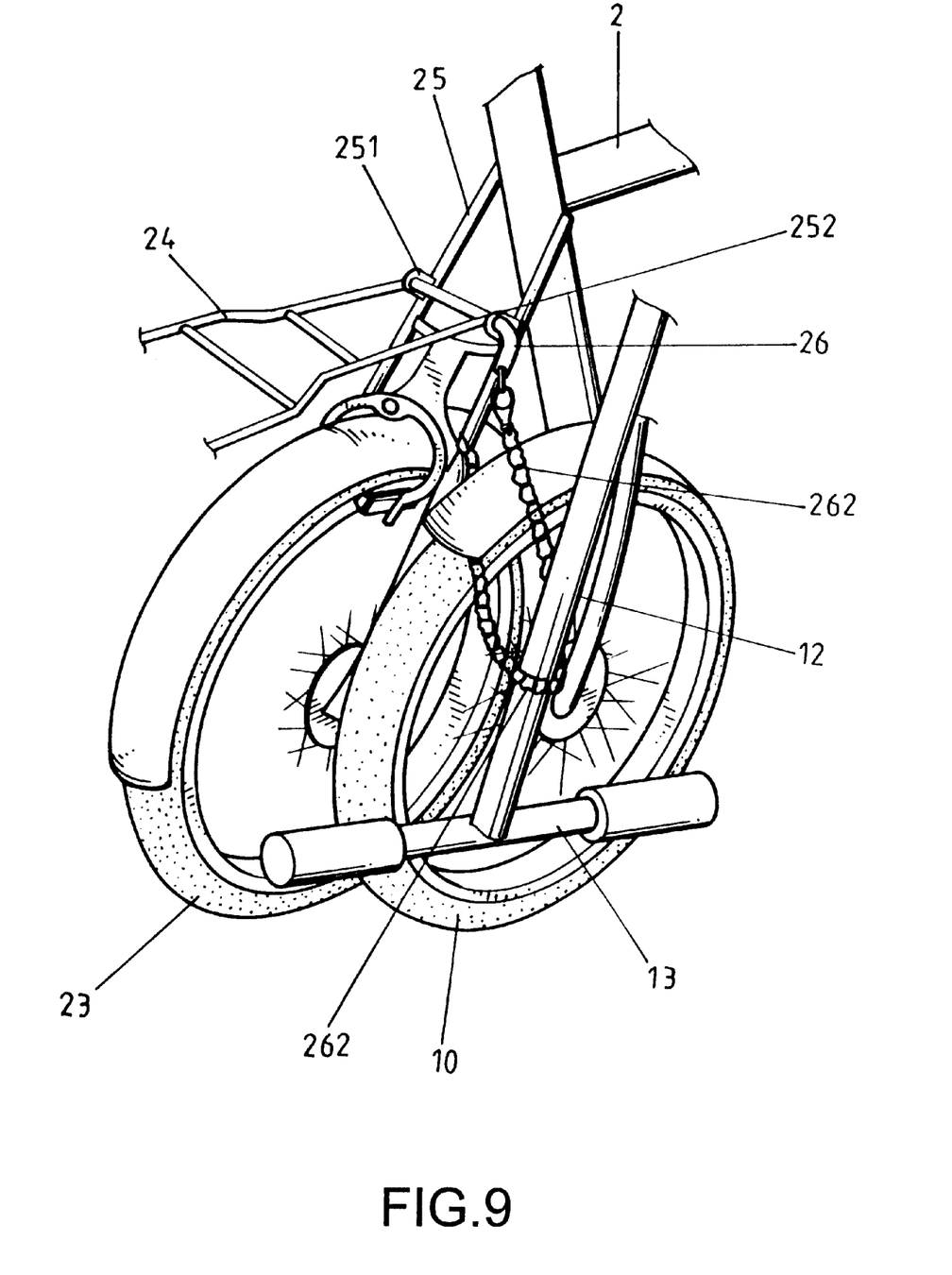
FIG. 9 is an isometric drawing of the rear frame and lock pin of the invention herein.

Referring to FIG. 8, FIG. 11, FIG. 12A, FIG. 12B, and FIG. 13, since there is a bottom bracket 20 at the lower extent of the rear frame 2 and, furthermore, a recess 202 of a flat surface 201 extending outward, insertion into the crankarm hole 171 of the pedal 17 is enabled for storage or utilization; as indicated in FIG. 8 and FIG. 1, beyond the pedal 17 is the mounting hole 173 of a sleeve 172, and at the outside of the sleeve 172 is the fillet 175 of a cam-lever 174, the assembly and disassembly of which is simple, easy, and convenient; a side stand 18 is installed at the lower extent of the rear frame 2 to enable the folded bicycle to remain stably and safely vertical on three points of support.

Referring to FIG. 1, FIG. 8, FIG. 9, and FIG. 10, to conveniently push or pull the folded bicycle of the invention herein with minimal effort when the lock pin 26 is fixed in the tab 251 on the seatstay 25, the rear rack 24 can be rotated away towards the ground surface and since the rear rack 24 is equipped with a roller wheel 241, the entire bicycle can be moved about will little force.

In summation of the foregoing section, since the invention herein eliminates the shortcomings of the conventional product, provides improved functionality, and increases the practical value of such products and, furthermore, has never been publicly disclosed or utilized prior to its introduction and is not easily achieved by persons skilled in the technology, the present invention complies with new patent application requirements and is hereby submitted for review and the granting of the commensurate patent rights.

What is claimed is:

1. A foldable bicycle that provides for the folding of the bicycle for easy portability and storage, comprising:

an insert box pivotally connected to an insert block, as well as a coupler box pivotally connected to a coupler block and respectively disposed at upper and lower portions between a front frame and a rear frame so as to pivotally connect the front and rear frames;

an insertion pin with an attached chain placed through aligned holes in the coupler box and the coupler block to secure the bicycle in an unfolded configuration;

a side stand installed at the lower portion of the rear frame to enable the folded bicycle to remain stably vertical;

a first cam lever mechanism installed between a top tube of the front frame and a head tube, the mechanism including an upper plate pivotally connected to a lower plate and a movable insert block movable by a cam lever to releasably lock the upper and lower plates together;

a quick-release stem clamp on the top tube providing for extension and retraction of a handlebar;

a seatpost tube situated over a rear wheel on the rear frame with a quick-release clamp on the seatpost tube providing for height adjustment of a saddle seatpost, the quick-release clamp comprising a band having through-holes in two ends, and a second cam lever mechanism extending through the through-holes and engaging the band;

a tab on a seatstay of the rear frame, the tab having a through-hole with a slot to enable the securing of a front wheel, the rear wheel, and the top tube by a lock pin having an attached chain and a protruding block inserted into the through-hole in the tab such that, when the bicycle is folded, a rear rack equipped with a roller wheel enables the movement of the folded bicycle with minimal effort; and, the rear frame has a bottom bracket on which pedals having crank arms are mounted by a third cam lever mechanism whereby the pedals may be moved between outward extending positions for use and inward extending positions for storage.

* * * * *